United States Patent [19]

Hawes

[11] 4,154,306

[45] May 15, 1979

[54] REVERSIBLE PLOUGHS

[75] Inventor: Richard J. Hawes, Ipswich, England

[73] Assignee: Ransomes Sims & Jefferies Limited, Ipswich, England

[21] Appl. No.: 865,252

[22] Filed: Dec. 28, 1977

[30] Foreign Application Priority Data

Jan. 4, 1977 [GB] United Kingdom ............... 55/77

[51] Int. Cl.² ............................................. A01B 3/34
[52] U.S. Cl. .................................. 172/225; 172/666; 172/439
[58] Field of Search ............... 172/224, 225, 226, 232, 172/666, 227

[56] References Cited

U.S. PATENT DOCUMENTS

| 3,305,027 | 2/1967 | Walberg | 172/225 |
| 4,067,396 | 1/1978 | Watts | 172/225 |

FOREIGN PATENT DOCUMENTS

| 946226 | 1/1964 | United Kingdom | 172/224 |
| 1190530 | 5/1970 | United Kingdom | 172/225 |

Primary Examiner—George J. Marlo
Attorney, Agent, or Firm—Ira Milton Jones & Associates

[57] ABSTRACT

A reversible plough has a headstock, a plough frame and a reversing spindle secured to the frame and rotatable in the headstock. A stop member rotatable about the reversing spindle is provided with two adjustable stops to enable the two ploughing positions of the plough frame to be preset relative to the headstock. To reverse the plough frame from one ploughing position to the other, the spindle and thus the plough frame is rotated by a hydraulic ram and an abutment on the spindle engages the stop member to cause said member to rotate with the spindle until the corresponding stop engages the headstock to locate the spindle and hence the plough frame in the other ploughing position.

15 Claims, 5 Drawing Figures

REVERSIBLE PLOUGHS

This invention relates to reversible ploughs.

In general, means have to be provided for rotation of the plough frame to effect reversal and for locating the plough frame in either of its two, usually adjustable, ploughing positions. It is an object of the present invention to provide a reversible plough having improved mechanism for effecting this location.

Accordingly, the present invention consists in a reversible plough comprising a headstock adapted for connection to a tractor and having bearing means providing a reversing axis; a reversing spindle rotatably mounted in the bearing means along said axis; a plough frame secured to the reversing spindle for rotation therewith and for supporting left and right handed plough bodies; a hydraulic ram for rotating the reversing spindle to effect reversal of the plough frame; a stop member rotatable about the reversing spindle and having a pair of stops corresponding to right and left handed ploughing positions of the frame respectively and being adjustable in position relative to the stop member to enable pre-setting of said ploughing positions relatively to the headstock and an abutment fixed to the reversing spindle to rotate therewith; whereby upon rotation of the reversing spindle by the ram to effect reversal of the plough frame from one to the other of said ploughing positions, said abutment engages said stop member the member thereafter rotating with the reversing spindle until the stop corresponding with the said other ploughing position engages the headstock to prevent further rotation of the plough frame and to locate the plough frame in said other ploughing position as pre-set.

Advantageously, the stops comprise respective studs threadingly engaged within sockets formed on the stop member.

Suitably, the hydraulic ram is attached at one end thereof to the headstock and is connected at its other end to a crank member fixedly secured to the reversing spindle, said abutment being formed on the crank member.

The invention will now be described by way of example with reference to the accompanying drawings in which.

Figure 1:
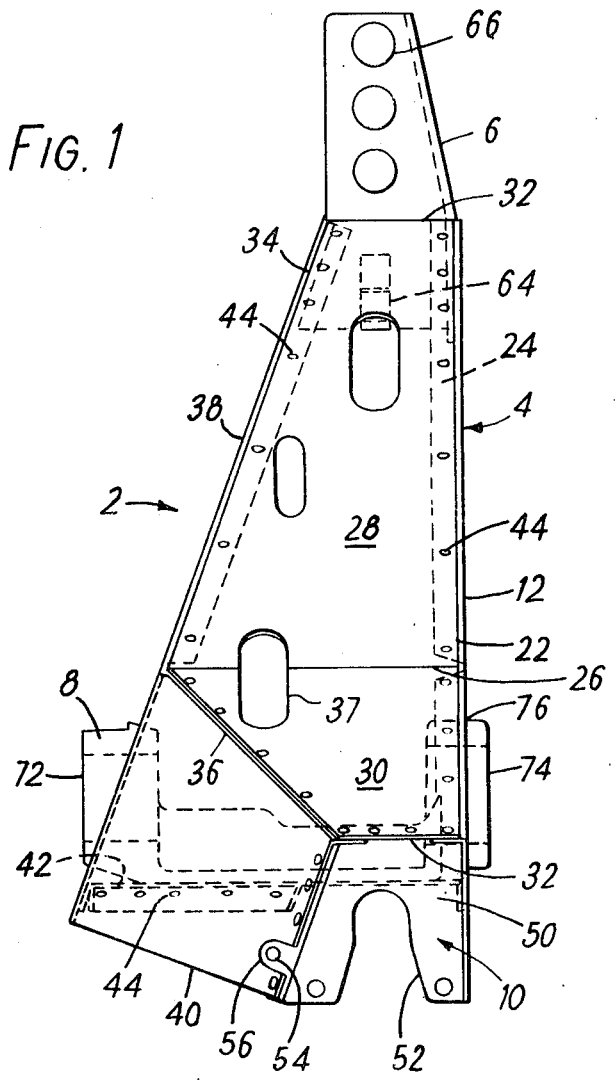
FIG. 1 is a side view of a headstock of a reversible plough according to the invention, with the majority of internal parts omitted for the sake of clarity.
Figure 2:
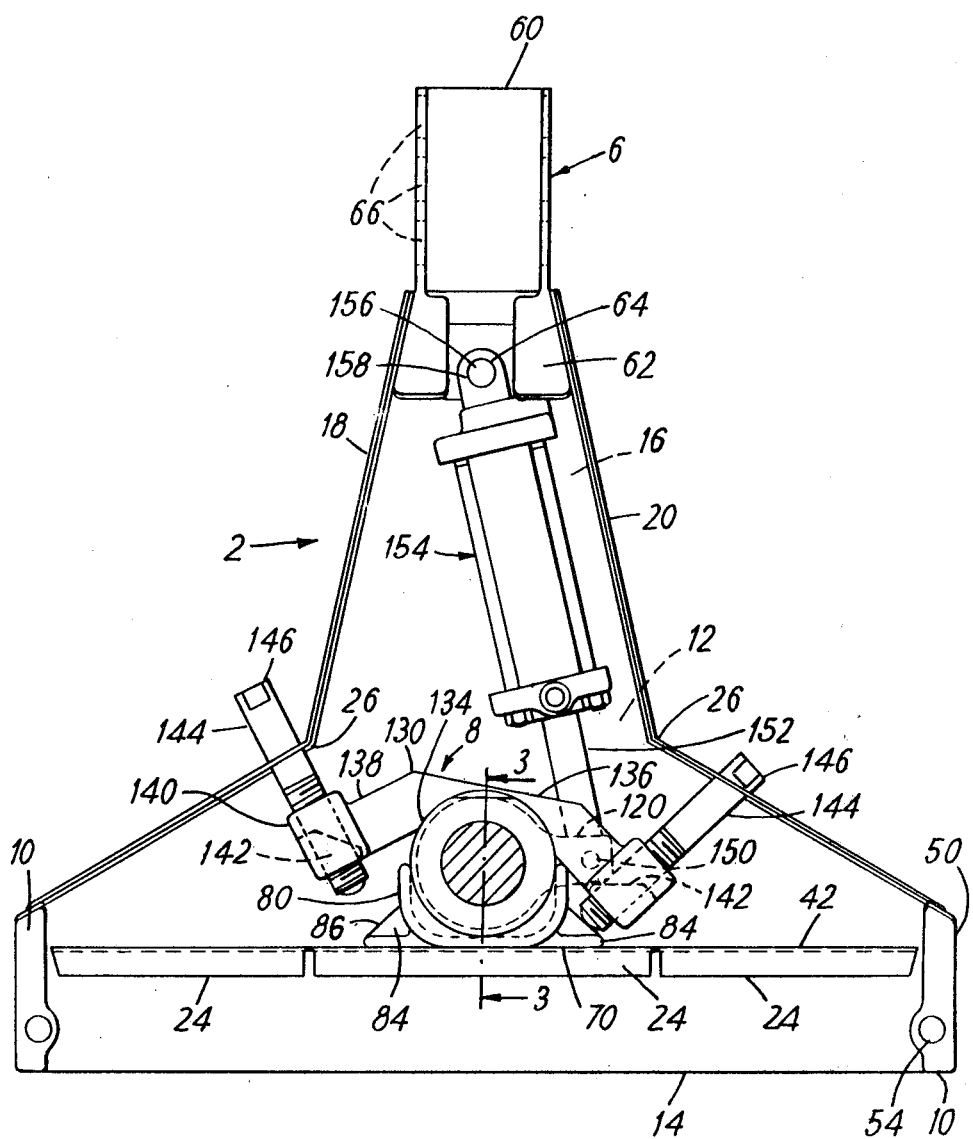
FIG. 2 is a front view of FIG. 1, with part of the headstock removed.

With reference to FIG. 1, the headstock 2 comprises a sheet metal shell 4 to which are secured a top link connecting member 6, a reversing spindle bearing assembly 8 and left and right bottom link connecting members 10 (only one seen in FIG. 1). The shell 4 is constructed from four steel sheets projection welded together at their peripheries. As will be understood, the technique of projection welding involves filling an aperture in one sheet with molten metal to join that sheet to a second sheet with which it is in close contact in the region of the aperture. The sheets comprise a back sheet 12 which is planar and—as best shown in FIG. 2—has the general shape of an inverted T with adjoining edges of the cross piece 14 and upright portion 16 respectively, being mutually inclined at both sides of the sheet, to increase their angle of intersection beyond a right angle. The two sides sheets 18 and 20 are identical apart from being right and left handed, respectively. Each side sheet has a straight edge 22 which overlies flanges 24 formed along the corresponding edge of the back sheet 12, and has a bend 26 normal to this straight edge dividing the side sheet into two trapezium shaped portions 28 and 30 mutually inclined at an angle equal to the angle of intersection of the crosspiece and the upright portion of the back sheet 12. The two edges 32 of each side sheet adjoining the straight edge 22 are normal to that straight edge whilst the edges 34 and 36 opposing the straight edge are mutually inclined forming an apex to the bend 26. Each side sheet is provided with a lozenge shaped aperture 37 which straddles the bend 26 in that sheet.

The front sheet 38 of the shell which has been removed from FIG. 2 is again of generally inverted T shape with, however, the two arms 40 of the cross piece formed at an angle to the plane of the T so as to co-operate with the corresponding inclined edges 36 of the side sheets 18, 20. The front sheet 38 as a whole is inclined to the plane of the back sheet 12 to allow engagement with corresponding inclined edges 34 of the side sheets. Flanges 24 are again provided on the front sheet 38 and these abut the inclined edges 34 and 36 of the side sheets.

The bottom sheet 42 of the shell is planar and is shaped to fit between the front and back sheets at a short distance above the bottom edges of those sheets. Flanges 24 are provided around the periphery of the bottom sheet 42 for flatwise engagement with the front and back sheets. At intervals along these flanges 24 and, similarly, along the flanges 24 of the front and back sheets, projection welds 44 are formed.

Each bottom link connecting member 10 comprises a plate 50 which is projection welded into the U-shaped channel formed between portion 40 of the front sheet, portion 30 of the corresponding side sheet and cross piece 14 of the back sheet 12. The outer face of plate 50 is flush with the edges of these sheets. A key hole slot 52 opens out into the free edge of the plate, whilst the edge of the plate abutting the front sheet 38 is formed with an upstanding lug 54 which co-operates with a complementary recess 56 in portion 40 of the front sheet 38.

The top link connecting member 6 comprises a U-shaped channel 60 (FIG. 2) which projects from the shell 4 through the aperture formed by the converging front, back and side sheets. Inwardly of the shell, the channel is projection welded in position and is formed with a cross piece 62 having a fore and aft aperture 64. Outwardly of the shell, the channel 60 is provided with three vertically spaced transverse apertures 66.

Figure 3:
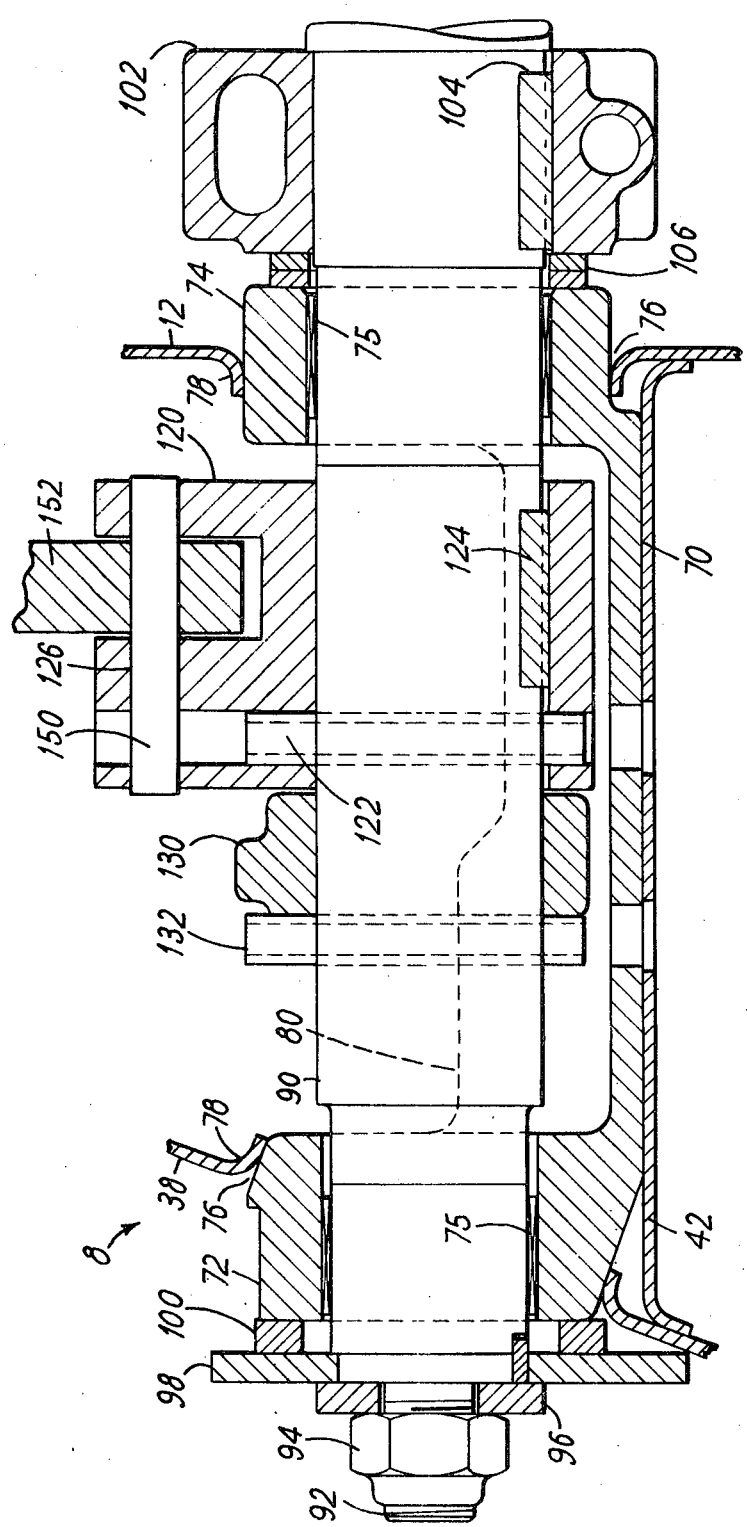
FIG. 3 is a section along 3—3 of FIG. 2 in a central position
Figure 4:
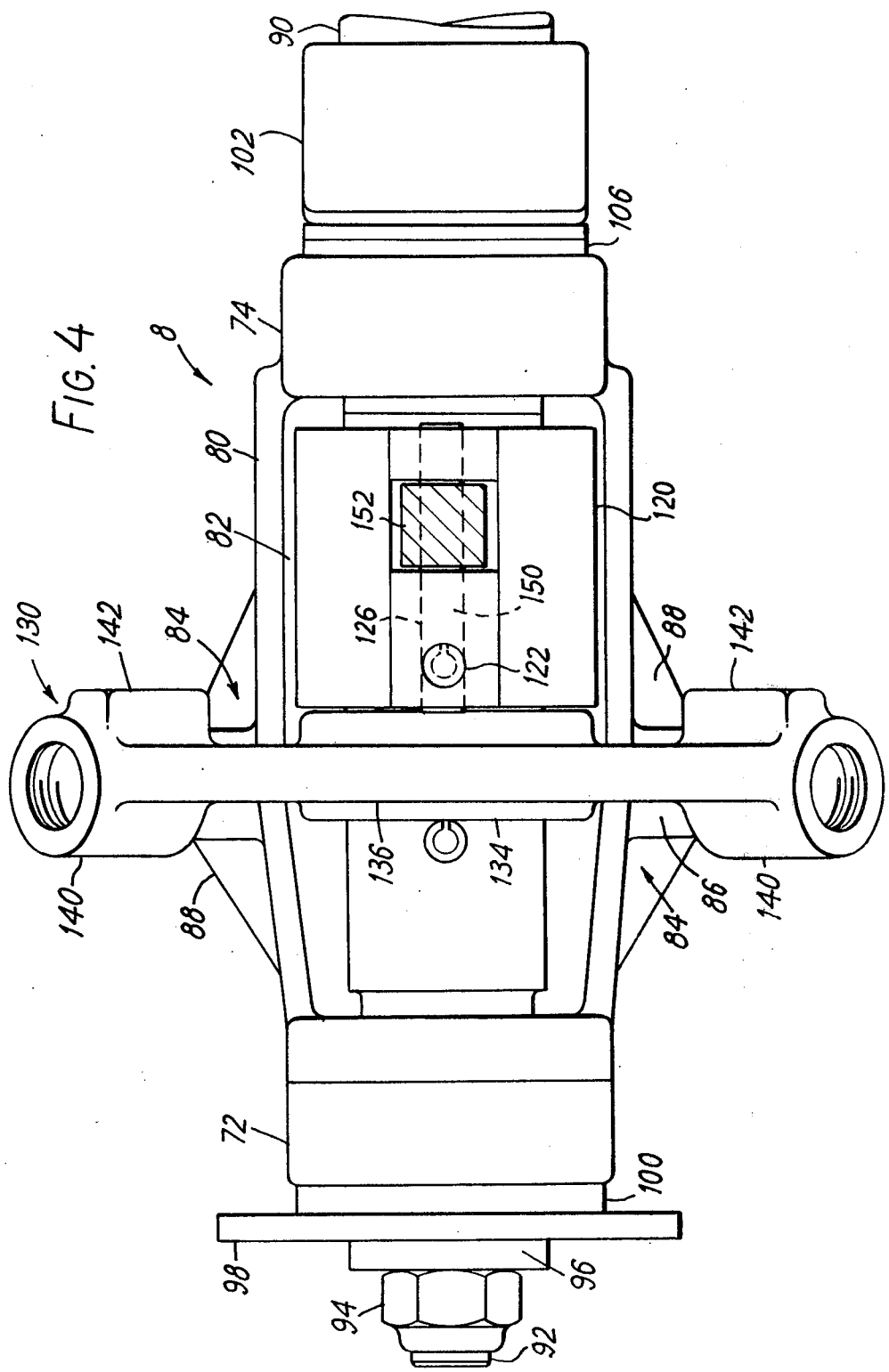
FIG. 4 is a plan view of FIG. 3.

The bearing assembly 8 rests on the bottom sheet 42 of the shell, and, as best seen in FIGS. 2, 3 and 4, comprises a base plate 70 supporting integral front and rear bearing supports in the form of coaxial collars 72 and 74 respectively, each provided with an interior bush 75. Each collar projects through a circular aperture 76 in the corresponding sheet of the shell 4, with the edge of each sheet adjacent the aperture being turned inwardly, as at 78 for closer engagement with the corresponding collar. Between the two collars, base plate 70 is provided with upstanding walls 80 which define therebetween a channel 82 lying parallel to the common axis of the collars. The base plate is further provided, intermediate the two collars 72, 74 and at either side of the channel 82, with an abutment 84 having an upper surface 86 inclined to the base plate 70, buttressed by flanges 88.

The reversing spindle 90 of the plough is located within the front and rear collars 72 and 74 which define the reversing axis of the plough. The front end of the reversing spindle is screw threaded at 92 to receive a nut 94 which bears against the front collar 72 via clamping washer 96, cam plate 98 and thrust bearing 100. In this way the spindle is held against axial rearward movement. At the rear of the headstock, the reversing spindle 90 passes through the rear collar 74 for engagement with the plough frame which, in FIGS. 3 and 4, is shown only in part. The forward clamping element 102 of the plough frame, which is the foremost part of the frame, is secured to the reversing spindle 90 so as to rotate therewith, by means of key 104. A thrust bearing 106 between the clamping element 102 and rear collar 74 restrains the reversing spindle against forward axial displacement.

Figure 5:
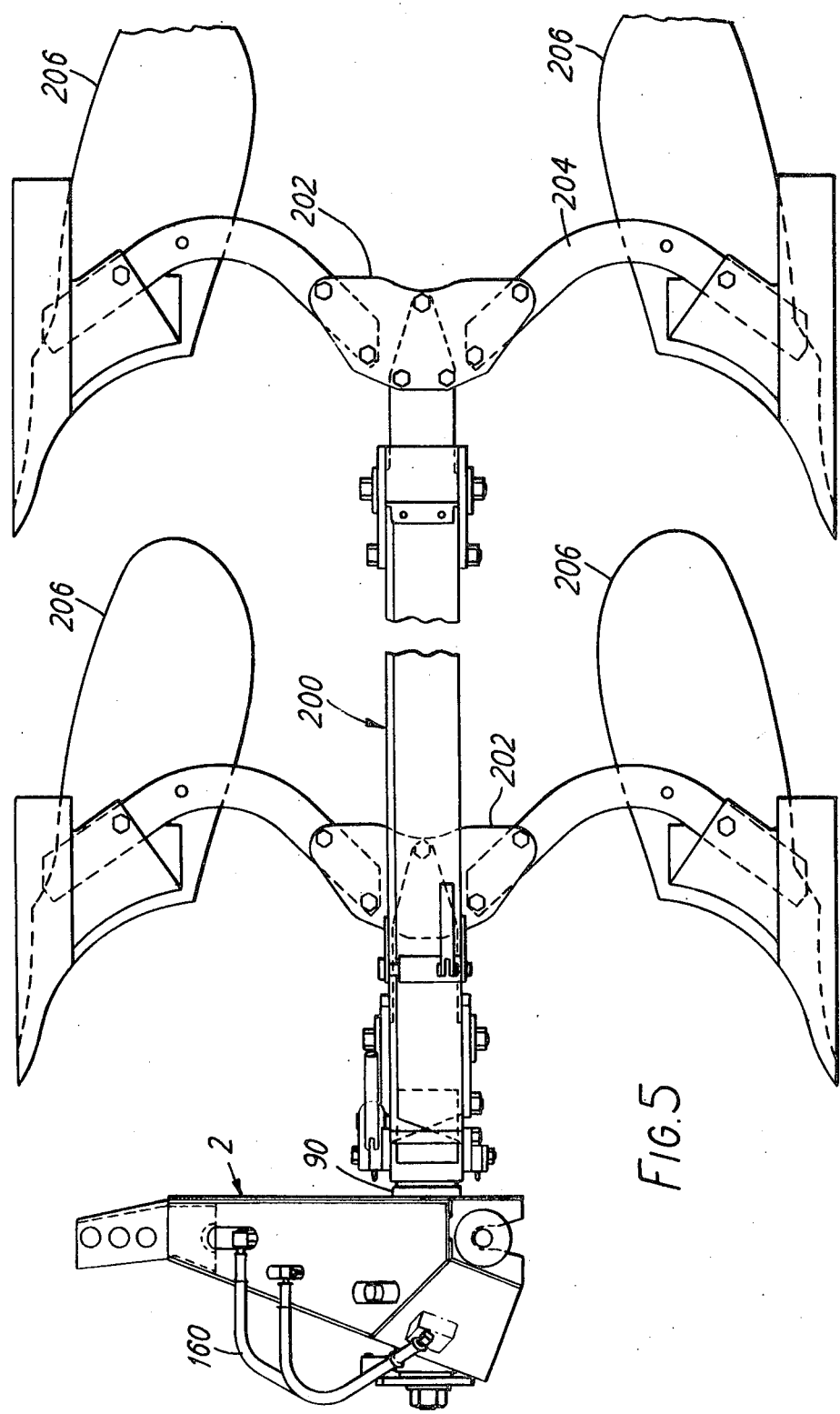
FIG. 5 is a side view of a reversible plough according to the invention incorporating a headstock as shown in FIGS. 1 to 4.

Between the front and rear collars, and hence inwardly of the shell 4, a cranked arm 120 is secured to the reversing spindle for rotation therewith. A tension pin 122 and the key 124 serve to prevent respectively axial and rotational movement of the crank arm relatively to the spindle. Remotely from the reversing spindle the crank arm is yoked and is provided with a fore and aft aperture 126. A pin 150 passing through this aperture locates the free end of a piston 152 of a double acting hydraulic ram 154. The ram 154 is pendantly supported from the top link connecting member 6 by means of a further pin 156 passing through an eye 158 formed at the end of the cylinder remote from the piston and through the fore and aft aperture 64 in the connecting member 6. Adjacent the crank arm 120, a wing stop member 130 is located on the reversing spindle. This wing stop member is freely rotatable on the spindle but is located axially in one sense by the crank arm 120 and in the other sense by a second tension pin 132 passing diametrically through the spindle. As shown in FIGS. 2 and 4, the wing stop member 130 comprises a collar 134, through which the reversing spindle passes, formed integrally with a tangential shoulder piece 136 provided with inclined arms 138 which project in generally opposite directions from the shoulder piece and which terminate in internally threaded cups 140. Each such cup 140 is provided, at the side thereof adjacent the crank arm, with a tongue 142. A threaded stud 144 having a socket formed in the end thereof co-operates with each cup 140. These threaded studs 144 are arranged so that their shaped ends project through the lozenge shaped aperture 37 in the corresponding side sheet. With reference to FIG. 5, the plough frame 200 is secured to the reversing spindle so as to rotate therewith. The plough leg supports 202, each supporting a pair of opposed plough legs 204, are mounted at intervals along the plough frame 200. A plough body 206 is secured to the free end of each plough leg 204, with the bodies on one side of the frame being left-handed and those on the opposite side being right-handed.

The operation of the described plough can now be understood. The headstock 2 is mounted to the three point linkage of a tractor, with the top link of the linkage being pinned through one of the apertures 66 to the top link connecting member 6. A horizontal bar connected to the tractor bottom links is positioned beneath the bottom link connecting members 10 of the headstock and is then raised by the tractor hydraulic system to engage within the key hole slots 52. This arrangement permits a speedy attachment of the plough to a tractor, though the more normal arrangement whereby each bottom link of the tractor three point linkage is separately pinned to the headstock could also be used.

To reverse the plough frame from the position shown in FIGS. 2 and 5 the tractor hydraulic system is activated to supply hydraulic fluid to the ram 154 through pipes 160. This causes the ram to retract, so effecting an anticlockwise rotation (in FIG. 2) of the reversing spindle and with it the plough frame 200. As the reversing spindle rotates the cam plate 98 co-operates with a hydraulic crossover valve so that as the mid-way position is reached with the hydraulic ram substantially vertical and with the opposed plough legs 204 of one pair lying in a horizontal plane, the supply of fluid to the double acting ram 154 is reversed. The resultant extension of the ram will continue the anticlockwise rotation of the reversing spindle and plough frame. A short while after passing the midway position, the crank arm 120 will come into contact with the tongue 142 of the corresponding wing stop arm 138. The wing stop member will thereafter rotate with the reversing spindle until the threaded stud 144 in the corresponding cup 140 engages the upper surface 86 of the associated abutment 84. Further rotation of the wing stop member and consequently of the reversing spindle, is thus prevented and, with back pressure in the hydraulic ram suitably preventing rotation in the opposite sense, the plough frame is firmly located in the left handed ploughing position. The action of the wing stop member upon reversal to the right handed ploughing position (shown in FIG. 2) is clearly analogous and will not be described.

It will be understood that the two ploughing positions of the plough frame can be pre-set relatively to the headstock by suitable positioning of each threaded stud in its cup 140. These studs are easily accessible at all times through the apertures 37 of the shell 4, since rotational movement of the wing stop member is kept to a minimum by the novel arrangement of this invention. Each ploughing position may nevertheless be present individually. Since the wing stop member rotates through a relatively small angle, a large volume is not required to be kept free and the wing stop member can be positioned inside the hollow headstock between the bearings 72 and 74. This has the important advantage that the plough frame can be positioned closer to the headstock than would be the case if the wingstop member were outside the headstock. Although, in the described embodiment the two studs 144 project through apertures in the headstock shell it will be appreciated that it is not essential that they do so, since external adjustment could equally be achieved by inserting a spanner or like tool through the apertures to turn the threaded studs 144.

I claim:

1. A reversible plough comprising a headstock adapted for connection to a tractor and having bearing means providing a reversing axis; a reversing spindle rotatably mounted in the bearing means for rotation about said axis; a plough frame secured to the reversing spindle for rotation therewith and for supporting left and right handed plough bodies; a hydraulic ram for rotating the reversing spindle to effect reversal of the plough frame; a stop member rotatable about the reversing spindle and having a pair of stops corresponding to right and left handed ploughing positions of the frame respectively and being adjustable in position relative to said stop member to enable pre-setting of said ploughing positions relatively to the headstock, and an abutment fixed to the reversing spindle to rotate therewith; whereby upon rotation of the reversing spindle by the ram to effect reversal of the plough frame from one to the other of said ploughing positions, said abutment engages said stop member, to cause the same to thereafter rotate with the reversing spindle until the stop corresponding with said other ploughing position engages the headstock to prevent further rotation of the plough frame and to locate the plough frame in said other ploughing position as pre-set.

2. A reversible plough according to claim 1, wherein said stops comprise respective studs threadingly engaged within sockets formed on the stop member.

3. A reversible plough according to claim 2, wherein the stop member comprises a collar coaxial with the reversing spindle and two arms extending generally radially of the collar and having said sockets formed respectively at their free ends.

4. A reversible plough according to claim 3, wherein the studs project from the headstock and are shaped for screw threaded adjustment externally of the headstock.

5. A reversible plough according to claim 1 wherein the hydraulic ram is attached at one end thereof to the headstock and is connected at its other end to a crank member fixedly secured to the reversing spindle.

6. A reversible plough according to claim 5, wherein the abutment fixed relatively to the reversing spindle is formed on the crank member.

7. A reversible plough according to claim 1, wherein the bearing means comprises a pair of spaced bearings, the stop member being positioned between the bearings.

8. A reversible plough according to claim 7, wherein the bearings are mounted on a common base plate, the base plate being formed with a pair of abutment surfaces for respective engagement by the stops.

9. A reversible plough according to claim 1, wherein the headstock comprises a rigid shell and the two stops project through apertures in the shell for external adjustment.

10. A reversible plough comprising: a headstock adapted for connection to a tractor; two spaced bearings secured in the headstock and providing a reversing axis; a reversing spindle rotatably mounted in the bearings for rotation about said axis; a plough frame secured to the reversing spindle for rotation therewith and supporting left and right handed plough bodies; a crank member fixedly secured to the reversing spindle between the bearings; a hydraulic ram connected between the headstock and the crank member for rotating the reversing spindle to effect reversal of the plough frame; a stop member rotatable about the reversing spindle and having a pair of stops corresponding to right and left handed ploughing positions of the frame respectively and being adjustable in position relative to the stop member to enable pre-setting of said ploughing positions relatively to the headstock; whereby upon rotation of the reversing spindle by the ram to effect reversal of the plough frame from one to the other of said ploughing positions, the crank member engages the stop member, so that the stop member thereafter rotates with the reversing spindle until the stop corresponding with said other ploughing position engages the headstock to prevent further rotation of the plough frame and thus locates the plough frame in said other ploughing position as pre-set.

11. A reversible plough characterized by:
A. a headstock adapted for connection to a tractor;
B. a bearing support fixed in the headstock;
C. bearing means providing a reversing axis and comprising a pair of spaced bearings mounted on said support;
D. a reversing spindle rotatably mounted in said bearings and extending therefrom along said axis;
E. a plough frame secured to the spindle for rotation therewith and adapted to support left and right-hand plough bodies;
F. a crank member on the spindle, located between said bearings;
G. a double acting hydraulic ram pendently supported at one end thereof in the headstock and connected at its other end with said crank member, for rotating the spindle to effect reversal of the plough frame between left and right-hand ploughing positions; and
H. means for constraining the reversing spindle to rotational movement between angular limits corresponding respectively with said ploughing positions of the plough frame, said constraining means comprising
  (1) a pair of abutments mounted in the headstock,
  (2) a stop member mounted on the spindle between said bearings and adjacent to the crank member, said stop member providing a pair of stops respectively cooperable with said abutments,
  (3) and said stop member comprising an integral collar which is rotatable about the reversing spindle and is engageable by a part on the spindle after initial rotation has been imparted thereto by the crank member, the stop member thereafter rotating with the spindle.

12. A reversible plough of the type comprising an elongated reversing spindle carrying left and right-hand plough bodies, and a headstock which is adapted for connection to a tractor and has bearings to support the spindle for rotation between left and right-hand ploughing positions, characterized by:
A. a fluid pressure operated actuator carried by the headstock and drivingly connected with the spindle to effect rotation thereof from either of its ploughing positions toward the other thereof;
B. and stop means to constrain the spindle to rotational movement between angular limits corresponding respectively with said ploughing positions thereof, said stop means comprising
  (1) a pair of spaced apart abutments carried by the headstock,
  (2) a stop member movably carried by the headstock for back and forth motion along a defined path leading from either of said headstock carried abutments toward the other thereof,
  (3) means carried by said stop member for movement therewith and providing a pair of abutments which are respectively engageable with said headstock carried abutments to limit motion of the stop member along its said path of movement, and
  (4) means providing a lost motion driving connection between the spindle and said stop member whereby motion of the latter and consequently of the spindle is limited by the headstock carried abutments only after a degree of motion of the spindle relative to the stop member.

13. The reversible plough of claim 12, wherein said stop member comprises a collar freely rotatably mounted on the spindle.

14. The reversible plough of claim 13, further characterized by:
   A. a pair of spaced apart bearings on the headstock in which the spindle is rotatably supported;
   B. said collar being located on the spindle between said bearings;
   C. and the driving connection between said fluid pressure operated actuator and the spindle comprising a crank arm fixed to the spindle at a location between said bearings and adjacent to said collar.

15. The reversible plough of claim 12, wherein the abutments of one of said pairs thereof are adjustable to provide for regulation of the limits of stop member motion.

* * * * *